US009557746B2

(12) United States Patent
Nefedov

(10) Patent No.: US 9,557,746 B2
(45) Date of Patent: Jan. 31, 2017

(54) VEHICLE ENERGY MANAGEMENT

(71) Applicant: QNX Software Systems Limited, Kanata (CA)

(72) Inventor: Mikhail Nefedov, Kanata (CA)

(73) Assignee: 2236008 Ontario Inc., Waterloo, Ontario (CA)

(*) Notice: Subject to any disclaimer, the term of this patent is extended or adjusted under 35 U.S.C. 154(b) by 139 days.

(21) Appl. No.: 13/974,506

(22) Filed: Aug. 23, 2013

(65) Prior Publication Data

US 2015/0057906 A1 Feb. 26, 2015

(51) Int. Cl.
*G05D 13/02* (2006.01)
*F02D 29/02* (2006.01)
*B60L 7/10* (2006.01)
*B60W 20/00* (2016.01)
*B60W 10/06* (2006.01)
(Continued)

(52) U.S. Cl.
CPC .............. *G05D 13/02* (2013.01); *B60L 7/10* (2013.01); *B60L 15/2045* (2013.01); *B60W 20/12* (2016.01); *B60W 20/16* (2016.01); *B60W 30/143* (2013.01); *B60W 30/188* (2013.01); *B60W 50/0097* (2013.01); *B60W 50/14* (2013.01); *F02D 29/02* (2013.01); *G07C 5/08* (2013.01); *B60W 2050/0077* (2013.01); *B60W 2520/10* (2013.01); *B60W 2550/143* (2013.01); *B60W 2550/402* (2013.01); *Y02T 10/56* (2013.01); *Y02T 10/7258* (2013.01); *Y02T 10/84* (2013.01); *Y10S 903/93* (2013.01)

(58) Field of Classification Search
CPC ............ B60R 16/0236; B60R 16/0237; B60W 30/143; B60W 30/14; B60W 50/0097;B60W 50/14; B60W 30/146; B60W 40/04; B60W 40/06; B60W 40/072; B60W 40/076; B60W 40/12; B60L 15/2045; G05D 1/0005
USPC ............ 701/70, 93, 123, 51, 54, 55, 56, 65, 67,701/99, 100, 101
See application file for complete search history.

(56) References Cited

U.S. PATENT DOCUMENTS 6,546,329 B2 * 4/2003 Bellinger .......... B60W 30/1819
123/478
8,965,597 B2 * 2/2015 Filev ...................... G06F 17/00
180/170
(Continued)

FOREIGN PATENT DOCUMENTS

WO WO 2012/088537 A1 6/2012

OTHER PUBLICATIONS

European Search Report for corresponding European Application No. 14181795.7 dated Feb. 11, 2015, 7 pages.

*Primary Examiner* — Thomas G Black
*Assistant Examiner* — Sara Lewandroski
(74) *Attorney, Agent, or Firm* — Brinks Gilson & Lione

(57) ABSTRACT

A system and method for vehicle energy management are described that take driving context into account to derive suggested vehicle control inputs to reduce energy consumption. Driving context may be based on information including, for example, traffic congestion and/or flow information for a traveled route, road topology information, traffic controls, weather conditions, vehicle characteristics, and other types of driving context information. The driving context may be used to derive suggested control inputs to reduce energy consumption. The suggested control inputs can, for
(Continued)

example, be expressed as: a suggested road speed, suggested gear selection, rate of acceleration or rate of deceleration.

18 Claims, 2 Drawing Sheets

(51) Int. Cl.

| | | |
|---|---|---|
| *B60W 10/08* | (2006.01) | |
| *B60L 15/20* | (2006.01) | |
| *G07C 5/08* | (2006.01) | |
| *B60W 50/00* | (2006.01) | |
| *B60W 50/14* | (2012.01) | |
| *B60W 30/14* | (2006.01) | |
| *B60W 30/188* | (2012.01) | |

(56) References Cited

U.S. PATENT DOCUMENTS

| | | | | |
|---|---|---|---|---|
| 2008/0071460 A1* | 3/2008 | Lu | ............. | B60T 7/18 701/93 |
| 2011/0130938 A1* | 6/2011 | Seok | ............. | B60W 10/06 701/93 |
| 2011/0184642 A1* | 7/2011 | Rotz | ............. | G01C 21/3492 701/533 |
| 2011/0313647 A1* | 12/2011 | Koebler | ............. | B60L 15/2045 701/123 |
| 2012/0010767 A1* | 1/2012 | Phillips | ............. | G01C 21/3469 701/22 |
| 2012/0197500 A1* | 8/2012 | Sujan | ............. | B60W 50/0097 701/51 |
| 2012/0197501 A1* | 8/2012 | Sujan | ............. | B60K 23/00 701/51 |
| 2012/0221216 A1* | 8/2012 | Chauncey | ............. | B60W 40/09 701/51 |
| 2012/0221234 A1* | 8/2012 | Sujan | ............. | G06Q 10/04 701/123 |
| 2013/0151047 A1* | 6/2013 | Choi | ............. | B60L 15/2045 701/22 |
| 2013/0226420 A1* | 8/2013 | Pedlar | ............. | B60K 31/047 701/67 |
| 2013/0274952 A1* | 10/2013 | Weslati | ............. | B60W 50/0097 701/1 |
| 2014/0129047 A1* | 5/2014 | Barrett | ............. | G07C 5/00 701/1 |
| 2014/0277835 A1* | 9/2014 | Filev | ............. | G01C 21/3469 701/2 |
| 2014/0277986 A1* | 9/2014 | Mahler | ............. | G06F 7/00 701/93 |
| 2015/0158397 A1* | 6/2015 | Soto | ............. | B60L 3/12 701/22 |
| 2015/0298555 A1* | 10/2015 | Bennett | ............. | B60L 1/003 701/22 |

\* cited by examiner

VEHICLE ENERGY MANAGEMENT

BACKGROUND

1. Technical Field

The present disclosure relates to the field of vehicle energy management. In particular, to a system and method for vehicle energy management.

2. Related Art

Many mechanisms have been developed to help optimize energy consumption in vehicles. However, some aspects of vehicle energy consumption continue to be significantly affected by driver related factors such as driving style (e.g heavy acceleration and sudden braking). Drivers sometimes choose less than optimal modes of operation of the vehicle based on a lack of information about the driving context (e.g. up coming traffic congestion and road topology ahead).

Existing systems that give fuel economy indications or driver suggestions are typically based on past and current vehicle state and/or operating conditions. For example, for naturally aspirated internal combustion engines the intake manifold vacuum can be used to infer efficient engine operation and can be displayed on a gauge. Also, instantaneous or average fuel consumption can be computed and displayed. In hybrid and electric vehicles instantaneous energy consumption can be displayed. These solutions are limited in their beneficial impact due to being retrospective in nature—that is, being based on past and current vehicle state and/or operating conditions.

BRIEF DESCRIPTION OF DRAWINGS

The system and method may be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

Other systems, methods, features and advantages will be, or will become, apparent to one with skill in the art upon examination of the following figures and detailed description. It is intended that all such additional systems, methods, features and advantages be included with this description and be protected by the following claims.

DETAILED DESCRIPTION

A system and method for vehicle energy management are described that take driving context into account to derive suggested vehicle control inputs to reduce energy consumption. Driving context may be based on information including, for example, traffic congestion and/or flow information for a traveled route, road topology information (e.g. changes of elevation and/or grade ahead), traffic controls (e.g. traffic lights, stop signs), weather conditions, vehicle characteristics (e.g. re-generative braking equipped, type of transmission (e.g. continuously variable or stepped gear ratio), vehicle energy consumption profile) and other types of driving context information. The driving context may be used to derive suggested control inputs (e.g. acceleration, deceleration or braking) to reduce energy consumption. The suggested control inputs may, for example, be expressed as: a suggested road speed, suggested gear selection, rate of acceleration or rate of deceleration.

The suggested control inputs may be displayed to the driver as a suggested speed indicator, an acceleration or deceleration magnitude indicator, or other similar displays. Alternatively or in addition, the suggested control inputs may be provided to a cruise control mechanism (including adaptive cruise control system) and/or powertrain management system.

Figure 1:
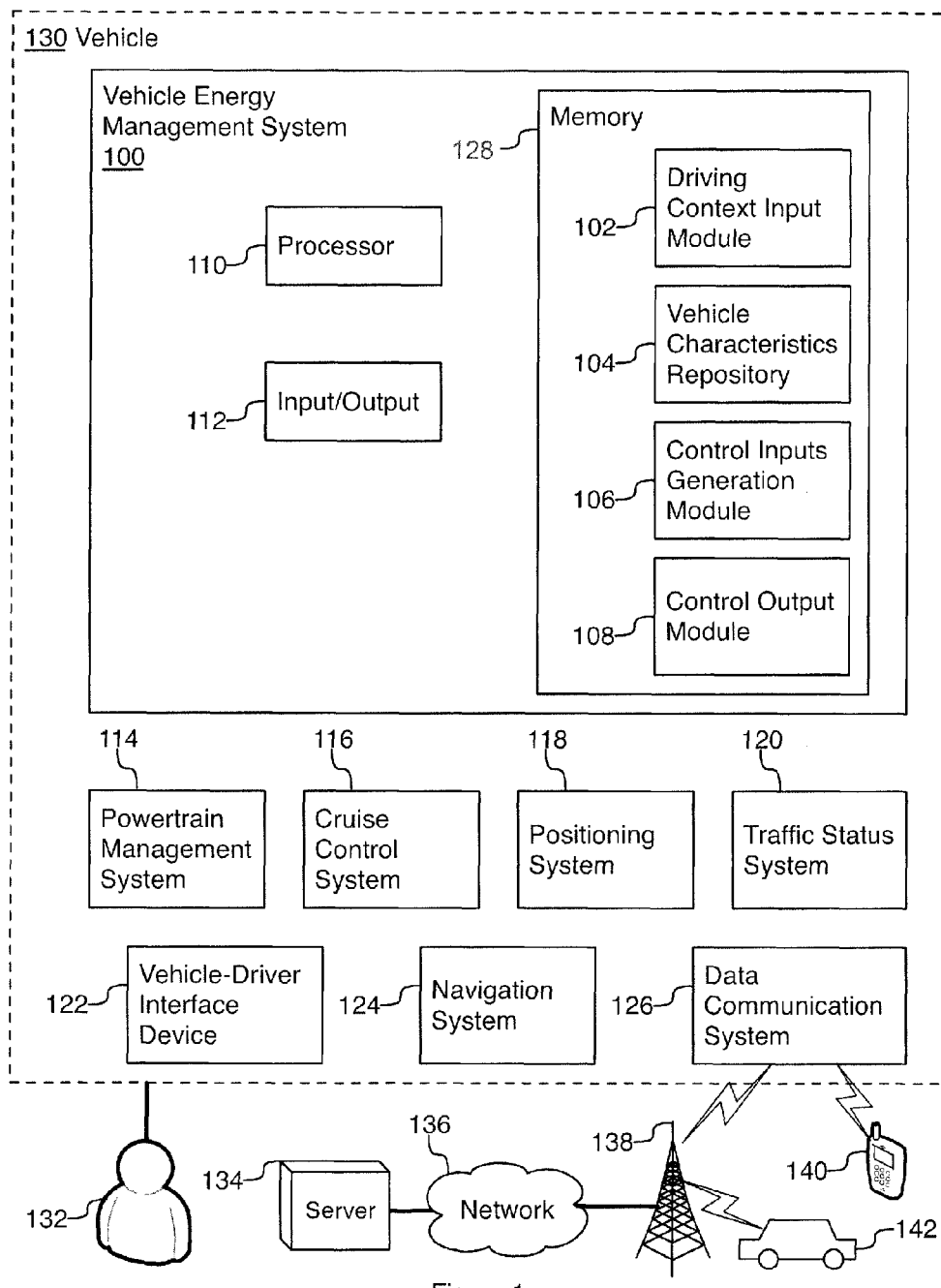
FIG. 1 is schematic representation of a system for vehicle energy management.

FIG. 1 is a schematic representation of a system for vehicle energy management. The system 100 comprises a driving-context input module 102, a control input generation module 106, a vehicle characteristics repository 104 and a control output module 108. The driving-context input module 102 may receive input signals and/or data related to driving-context from other vehicle-based systems such as a positioning system (e.g. global positioning system (GPS)) 118, a navigation system 124, a traffic status system 120, and a powertrain management system (e.g. engine control module (ECM)) 114. The driving-context input module 102 may, in addition or alternatively, receive input signals and/or data related to driving-context from one or more off-vehicle sources such as, for example, cloud-based servers 134, others vehicles 142 and mobile computing devices 140. The driving-context input module 102 may receive the input signals and/or data from the one or more off-vehicle sources via, for example, a data communication system 126, either directly or indirectly, including other wireless 138 and/or wireline 136 network infrastructure. The vehicle characteristic repository 104 may contain retrievable information pertinent to the vehicles energy consumption or management. The retrievable information may include vehicle characteristics and current operating state data. The control input generation module 106 may use inputs and data from the driving-context input module 102 and the vehicle characteristics repository 104 to derive suggested control inputs. The control output module 108 may output the suggested control inputs to, for example, any one of more of a vehicle-driver interface device (VDI) 122, a cruise control system 116 and a powertrain (a.k.a. drivetrain) management system 114. The VDI 122 may present the suggested control inputs to a driver 132 in one or more modes including, for example, visual, audible and tactile cues and/or indications.

The input signals and/or data related to driving-context received by the driving-context input module 102 may be received from systems such as, for example, the positioning system 118, the traffic status system 120, the navigation system 124, the cruise control system 116, the power train management system 114 and the VDI 122. The input signals and/or data related to driving-context may include, for example, vehicle speed, vehicle direction of travel (e.g. bearing), vehicle location (e.g. longitude and latitude), anticipated route (e.g. a navigation system planned route), cruise control status (e.g. active/inactive, speed setting), live traffic information (e.g. traffic management channel (TMC) information), topology and/or terrain information, and other similar information that may be related to driving-context. Input signals and/or data related to driving-context received from the VDI 122 may include inputs and/or selections made by the driver 132.

The off-vehicle sources may provide signals and/or data related to, for example, traffic information, topology information, traffic controls information, weather information and other similar information that may be pertinent to vehicle energy management. The traffic information may include, for example, crowd-sourced traffic information, real-time traffic information, sensor-based traffic information, time-of-day/day-of-week traffic profile information and other similar traffic information. The traffic controls information may include, for example, placement, type, cycle-time/schedule and operational state of traffic controls such as traffic lights, stop signs, yield signs, speed limit zones and other similar traffic controls. Topology information may include, for example, road layout, road elevation and road grade (i.e. slope) data, topography, road surface type (e.g. paved, gravel, dirt), road classification (e.g. single lane, multi-lane, limited access, level intersections, overpass) and other similar topology information.

The retrievable information stored in the vehicle characteristics repository 104 may include vehicle characteristics such as, for example, powertrain type (e.g. internal combustion engine, hybrid, electric), whether the vehicle is re-generative braking equipped, type of transmission (e.g. continuously variable or stepped gear ratio), vehicle energy consumption profile (e.g. fuel consumption versus engine speed, road speed or load) and other similar vehicle characteristics. The retrievable information may also include vehicle status information such as, for example, powertrain operating temperature, hybrid operating mode (e.g. electric, engine or combined propulsion), cruise control engaged, current road speed, throttle position and other similar vehicle status information.

The control input generation module 106 may use inputs and data from the driving-context input module 102 and the vehicle characteristics repository 104 to derive suggested control inputs. The derived suggested control inputs are directed to mitigating energy consumption by the vehicle 130. The control input generation module 106 uses the signals and data received via the driving-context input module 102 and/or the data retrieved from the vehicle characteristics repository 104 to generate a projected (a.k.a. anticipated) near-term future driving context. This may include using topographic information to determine, for example, that a current up-hill grade will end in 500 meters and then will be followed by a 2% down-hill grade for an additional 800 meters. In another example the projected near-term future driving context may include a stop sign ahead or an increase in speed limit ahead. In a further example when the vehicle is approaching a traffic light that is beyond the driver's line of sight (e.g. where the road turns ahead or there is an elevation change), the system 100 may be able to project based on, for example, known traffic light cycle-time and/or time-of-day that the traffic light will be signaling 'stop' (e.g. indicating 'red') when the vehicle 130 arrives and therefore may generate a suggested control input that forgoes further acceleration and/or recommends coasting as the vehicle approaches the traffic light. Projecting the driving context may include the use of extrapolation, interpolation or other projection or prediction techniques. In another example, when driving from a starting point A to an end point B and traffic information (e.g. crowd-sourced traffic information) indicates that there is congestion at a point between A and B, the system 100 may derive a suggested control input that would result in the vehicle 130 travelling at a speed below a speed-limit for the route (or speed-limits for sections of the route) in order to mitigate slowing or stopping due to the congestion or in hopes that the congestion will dissipate before the vehicle 130 arrives at the point of congestion thereby mitigating energy consumption. The foregoing examples are only illustrative in nature and are in no way meant to be limiting.

The control input generation module 108 may use the projected near-term future driving context to derive one or more suggested control inputs. The suggested control inputs may include, for example, accelerate (optionally including a magnitude indication), decelerate (optionally including a magnitude indication), maintain a constant speed, prepare to brake, brake (optionally including a magnitude indication) and other similar suggested control inputs.

The suggested control inputs may be displayed, or otherwise presented, through the VDI 122 to provide the driver 132 with an indication (a.k.a. hints or cues) as to what vehicle control inputs will mitigate energy consumption by the vehicle 130 based on the projected near-term future driving context. Alternatively, or in addition, the suggested control inputs may be provided to the cruise control system 116. The cruise control system 116, when activated, may for example use the suggested control inputs to adjust a speed setting upwardly or downwardly in accordance with the suggested control inputs or may disengage the cruise control system 116. Further alternatively, or in addition, the suggested control inputs may be provided to the powertrain management system 114. The powertrain management system 114 may for example use the suggested control inputs to adapt, configure or operate one or more components of the powertrain (a.k.a. drivetrain) in order to mitigate power consumption.

Figure 2:
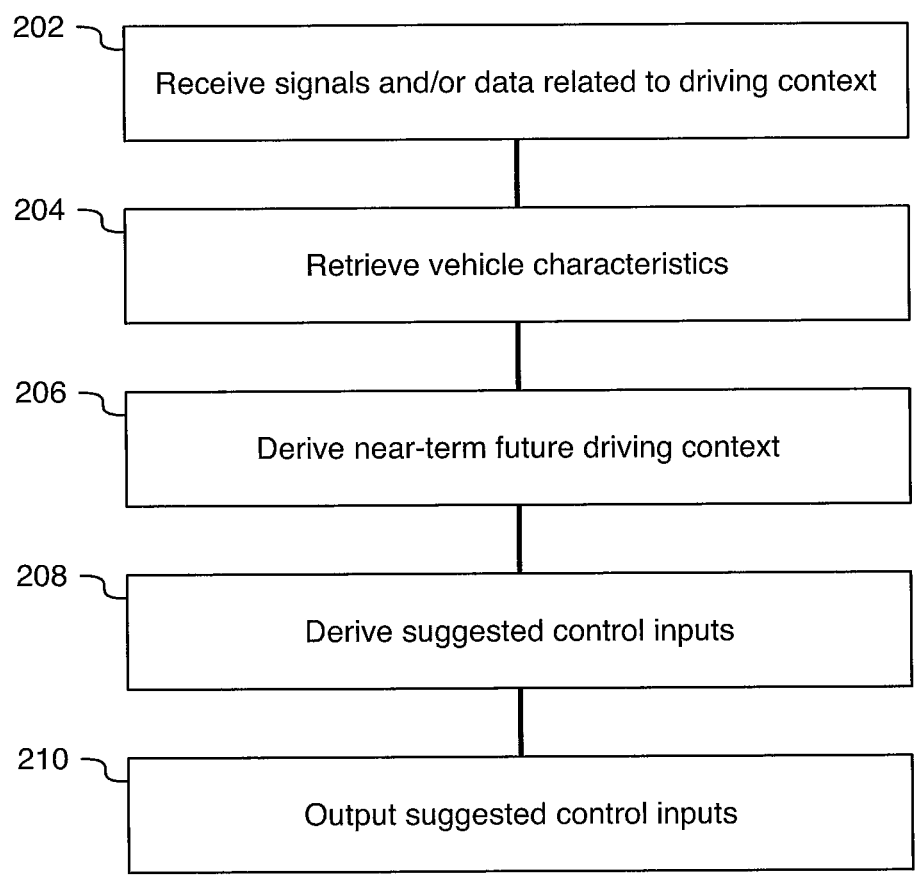
FIG. 2 is a representation of a method for vehicle energy management.

FIG. 2 is a representation of a method for vehicle energy management. The method 200 may, for example, be implemented using the system 100 described herein with reference to FIG. 1. The method 200 may include the following acts. Receiving signals and/or data related to the vehicle driving context 202. The input signals and/or data related to driving context received may include, for example, vehicle speed, vehicle direction of travel (e.g. bearing), vehicle location (e.g. longitude and latitude), anticipated route (e.g. a navigation system planned route), cruise control status (e.g. active/inactive, speed setting), live traffic information (e.g. traffic management channel (TMC) information), topology and/or terrain information, traffic information, topology information, traffic controls information, weather information and other similar information that may be related to driving context. Retrieving vehicle characteristics 204. The retrieved vehicle characteristics may include, for example, powertrain type (e.g. internal combustion engine, hybrid, electric), whether the vehicle is re-generative braking equipped, type of transmission (e.g. continuously variable or stepped gear ratio), vehicle energy consumption profile (e.g. fuel consumption versus engine speed, road speed or load) and other similar vehicle characteristics. The retrievable information may also include vehicle status information such as, for example, powertrain operating temperature, hybrid operating mode (e.g. electric, engine or combined propulsion), cruise control engaged, current road speed, throttle position and other similar vehicle status information. Projecting a near-term future driving context 206. The received signals and/or data related to driving context and/or the retrieved vehicle characteristics may be used to project a near-term future driving context. Deriving one or more suggested control inputs 208. The projected near-term future driving context in combination with any of the received signals and/or data related to driving context and the retrieved vehicle characteristics may be used to derive one or more suggested control inputs. The suggested control inputs may include, for example, accelerate (e.g. including a magnitude indication), decelerate (e.g. including a magnitude indication), maintain a constant speed, prepare to brake, brake (e.g. including a magnitude indication) and other similar suggested control inputs. Outputting the one or more suggested control inputs 210. The suggested control inputs may be output by displaying, or otherwise presenting, them to the driver 132 to provide an indication as to what vehicle control inputs may mitigate energy consumption by the vehicle 130. Alternatively, or in addition, the suggested control inputs may be outputted by providing them to a cruise control system 116 and/or a powertrain management system 114.

Referring again to FIG. 1, the system 100 may further comprise a processor 110, memory 128 (the contents of which are accessible by the processor 110) and an I/O interface 112. The memory 114 may store instructions which when executed using the process 110 may cause the system 100 to render the functionality associated with the driving-context input module 102, the control input generation module 106, the vehicle characteristics repository 104 and the control output module 108 as described herein. In addition the memory 128 may store all or a portion of the data related to driving-context, the vehicle characteristics, vehicle status information, projected near-term future driving context and the suggested control inputs.

The processor 110 may comprise a single processor or multiple processors that may be disposed on a single chip, on multiple devices or distributed over more that one system. The processor 110 may be hardware that executes computer executable instructions or computer code embodied in the memory 128 or in other memory to perform one or more features of the system 100. The processor 110 may include a general purpose processor, a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memory 128 may comprise a device for storing and retrieving data, processor executable instructions, or any combination thereof. The memory 114 may include non-volatile and/or volatile memory, such as a random access memory (RAM), a read-only memory (ROM), an erasable programmable read-only memory (EPROM), or a flash memory. The memory 114 may comprise a single device or multiple devices that may be disposed on one or more dedicated memory devices or on a processor or other similar device. Alternatively or in addition, the memory 114 may include an optical, magnetic (hard-drive) or any other form of data storage device.

The memory 114 may store computer code, such as instructions to implement the driving-context input module 102, the control input generation module 106, the vehicle characteristics repository 104 and the control output module 108 as described herein. The computer code may include instructions executable with the processor 110. The computer code may be written in any computer language, such as C, C++, assembly language, channel program code, and/or any combination of computer languages. The memory 114 may store information in data structures including, for example, all or a portion of the data related to driving-context, the vehicle characteristics, vehicle status information, near-term future driving context and the suggested control inputs.

The I/O interface 112 may be used to connect devices such as, for example, the positioning system 118, the traffic status system 120, the navigation system 124, the cruise control system 116, the power train management system 114, the VDI 122, the data communication system 126 and to other components of the system 100.

All of the disclosure, regardless of the particular implementation described, is exemplary in nature, rather than limiting. The system 100 may include more, fewer, or different components than those illustrated in FIG. 1. Furthermore, each one of the components of system 100 may include more, fewer, or different elements than are illustrated in FIG. 1. Flags, data, databases, tables, entities, and other data structures may be separately stored and managed, may be incorporated into a single memory or database, may be distributed, or may be logically and physically organized in many different ways. The components may operate independently or be part of a same program or hardware. The components may be resident on separate hardware, such as separate removable circuit boards, or share common hardware, such as a same memory and processor for implementing instructions from the memory. Programs may be parts of a single program, separate programs, or distributed across several memories and processors.

The functions, acts or tasks illustrated in the figures or described may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing, distributed processing, and/or any other type of processing. In one embodiment, the instructions are stored on a removable media device for reading by local or remote systems. In other embodiments, the logic or instructions are stored in a remote location for transfer through a computer network or over telephone lines. In yet other embodiments, the logic or instructions may be stored within a given computer such as, for example, a CPU.

While various embodiments of the system and method for vehicle energy management have been described, it will be apparent to those of ordinary skill in the art that many more embodiments and implementations are possible within the scope of the present disclosure. Accordingly, the system and method are not to be restricted except in light of the attached claims and their equivalents.

The claims are as follows:

1. A method for vehicle energy management comprising:
   in a controlled vehicle, receiving electronic signals and data related to a driving context from a plurality of data sources including crowdsourcing while the vehicle is operating;
   retrieving the driving context that includes vehicle characteristics and data generated by a powertrain management system from a memory in the controlled vehicle;
   projecting a future driving context based on the data generated by the powertrain management system in the controlled vehicle in response to the driving context;
   deriving one or more suggested control inputs in the controlled vehicle in response to the driving context and the future driving contexts; and
   in the controlled vehicle, automatically adjusting powertrain functions and a magnitude of braking in the controlled vehicle in response to processing the one or more suggested control inputs;
   where the future driving context conveys an external driving environment that the controlled vehicle is about to encounter.

2. The method for vehicle energy management of claim 1, where the projected future driving context is a near-term future driving context.

3. The method for vehicle energy management of claim 1, where the electronic signals and data related to driving context includes data representing any one or more of a vehicle speed, a vehicle direction of travel, a vehicle location, an anticipated route, a cruise control status, live traffic information, a route topology, terrain information, traffic information, traffic controls information or weather information.

4. The method for vehicle energy management of claim 1, where the electronic signals and data represent vehicle data that comprises content identifying powertrain type, whether the controlled vehicle is re-generative braking equipped, a type of transmission or a vehicle energy consumption profile.

5. The method for vehicle energy management of claim 1, where the one or more suggested control inputs include commands directing an acceleration, a maintenance of a constant speed, and a preparation to brake.

6. The method for vehicle energy management of claim 1, where the processing of the one or more suggested control inputs further comprises transmitting the suggested control inputs to an input/output device that renders the control inputs to a driver to provide an indication as to what vehicle control inputs may mitigate energy consumption by the controlled vehicle.

7. The method for vehicle energy management of claim 1, where the processing of the one or more suggested control inputs further comprises transmitting the suggested control inputs to a cruise control system and the powertrain management system.

8. The method for vehicle energy management of claim 1 further comprising automatically making a gear selection.

9. A system for vehicle energy management comprising:
a driving-context input module in a controlled vehicle that receives electronic signals wirelessly and data representing a driving context from a plurality of sources including crowdsourcing and also receives electronic signals from an on-board powertrain management system;
a vehicle characteristics repository to store and provide access to vehicle characteristics;
a control inputs generation processor to project a future driving context based on the data generated by the powertrain management system and from the signals and data related to the driving context and the vehicle characteristics, and to derive one or more suggested control inputs based on the projected future driving context, the signals and data related to the driving context, and the vehicle characteristics; and
a control output module that transmits the suggested control inputs to the powertrain management system that adjusts operating engine functions of the controlled vehicle by indicating an amount of brake force to be applied in response to the suggested control inputs;
where the future driving context comprises an anticipated external driving environment that the controlled vehicle is about to encounter.

10. The system for vehicle energy management of claim 9, where the projected driving context is a near-term future driving context.

11. The system for vehicle energy management of claim 9, where the electronic signals and data related to driving context includes content identifying a vehicle speed, a direction of travel, a location, an anticipated route, a cruise control status, live traffic information, topology, terrain information, traffic information about the route, traffic controls information or weather information.

12. The system for vehicle energy management of claim 9, where the electronic signals and data represent vehicle data that comprises content identifying powertrain type, whether the controlled vehicle is re-generative braking equipped, a type of transmission of the controlled vehicle and a vehicle energy consumption profile.

13. The system for vehicle energy management of claim 9, where the one or more suggested control inputs include any of a command directing an acceleration, a maintaining a constant speed, and a preparation to brake.

14. The system for vehicle energy management of claim 9, where the control output module transmits the one or more suggested control inputs to a vehicle-driver interface that renders the suggested control inputs to a driver to provide an indication as to what vehicle control inputs may mitigate energy consumption by the controlled vehicle.

15. The system for vehicle energy management of claim 9, where the control output module transmits the one or more suggested control inputs to a cruise control system.

16. The system for vehicle energy management of claim 9, further comprising:
one or more processors; and
memory;
where any of the driving-context input module, vehicle characteristics repository, and control output module comprises processor executable instructions stored in the memory.

17. The system for vehicle energy management of claim 9 where one of the suggested control inputs comprises a gear selection.

18. A non-transitory computer readable medium storing a program for vehicle energy management comprising:
in a controlled vehicle, computer program code that receives electronic signals and data related to a driving context from a plurality of data sources including crowdsourcing while the vehicle is operating;
computer program code that retrieves the driving context that includes vehicle characteristics and data generated by a powertrain management system from a memory in the controlled vehicle;
computer program code that projects a future driving context based on the data generated by the powertrain management system in the controlled vehicle in response to the driving context;
computer program code that derives one or more suggested control inputs in the controlled vehicle in response to the driving context and the future driving contexts; and in the controlled vehicle, computer program code that automatically adjusts powertrain functions and a magnitude of braking in the controlled vehicle in response to processing the one or more suggested control inputs;
where the future driving context conveys an external driving environment that the controlled vehicle is about to encounter.

* * * * *